United States Patent Office 3,509,341
Patented Apr. 28, 1970

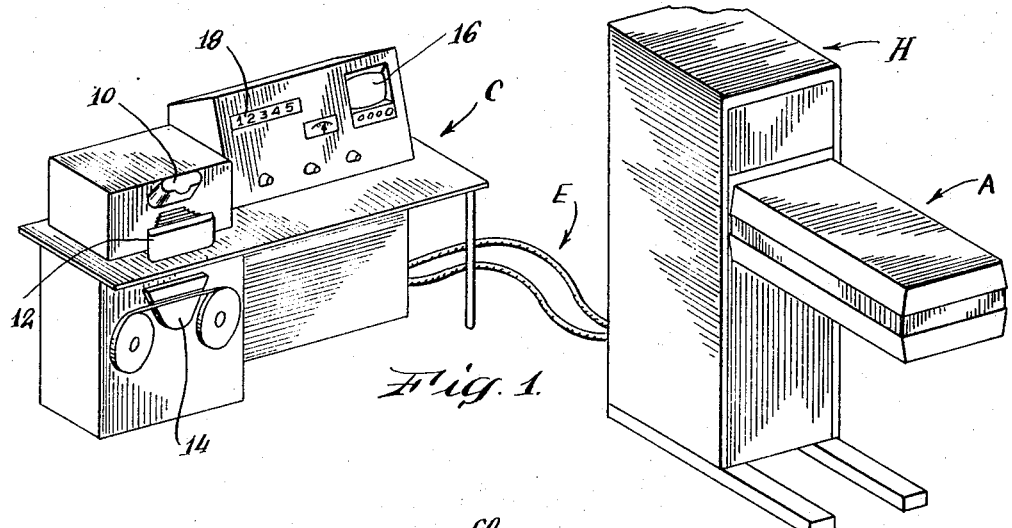
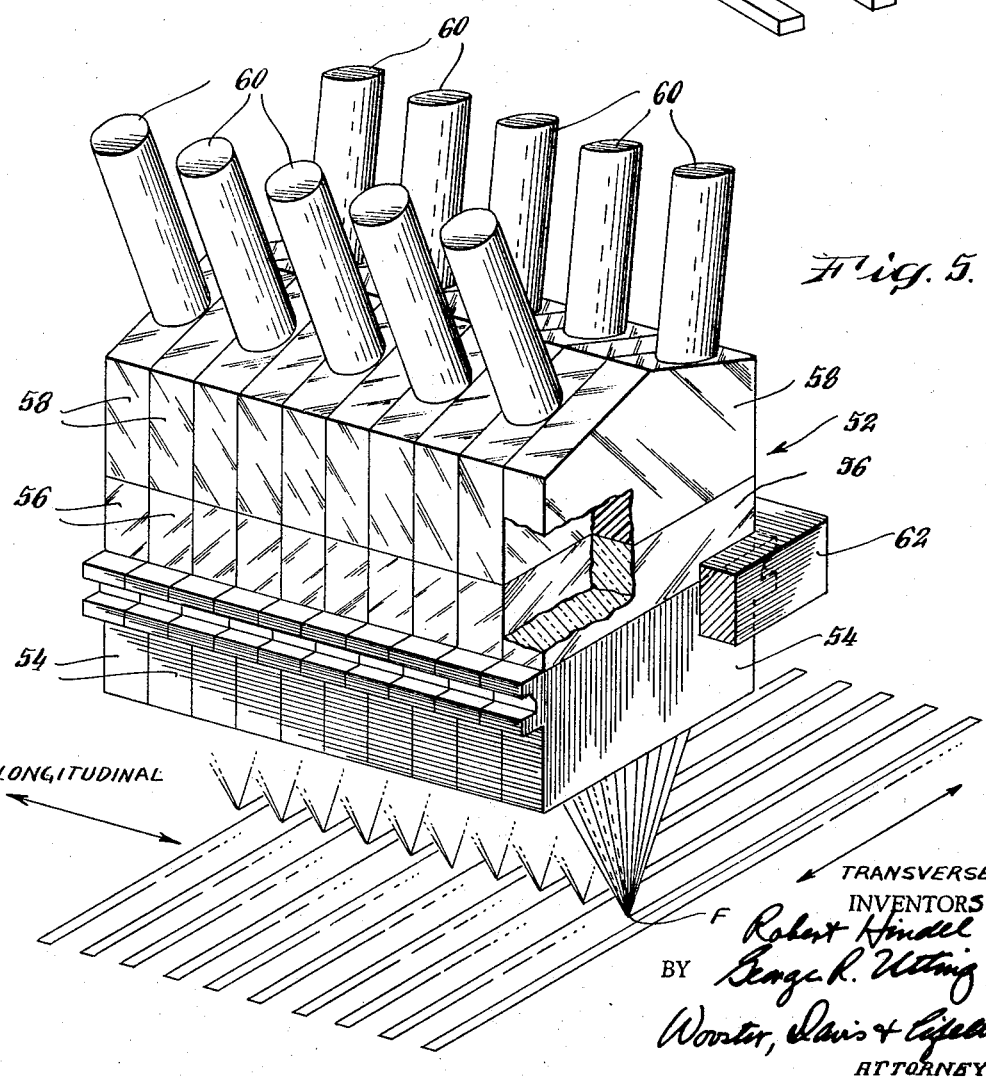

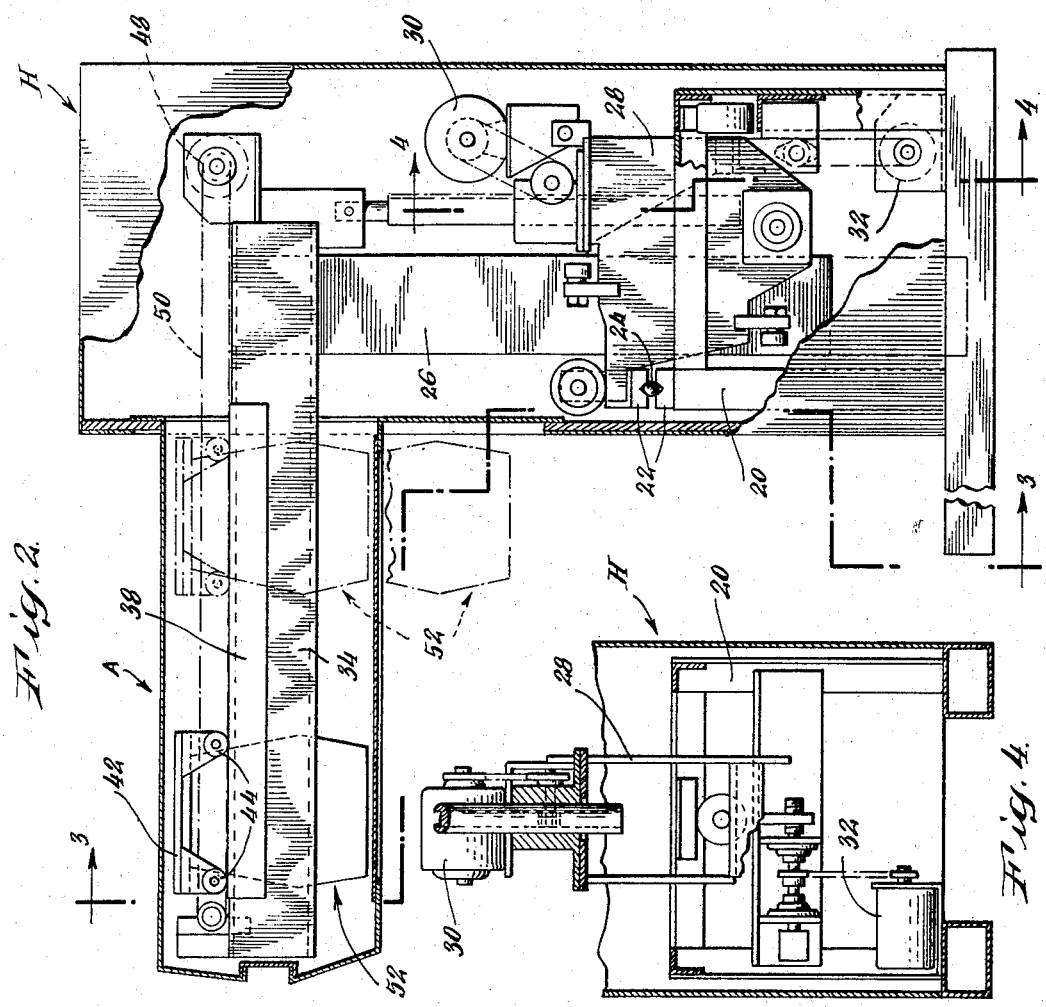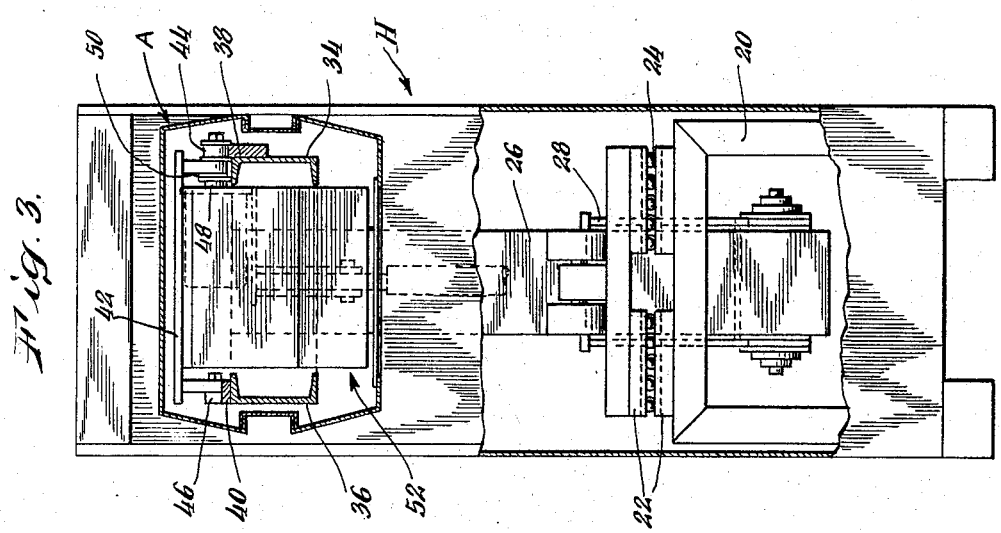

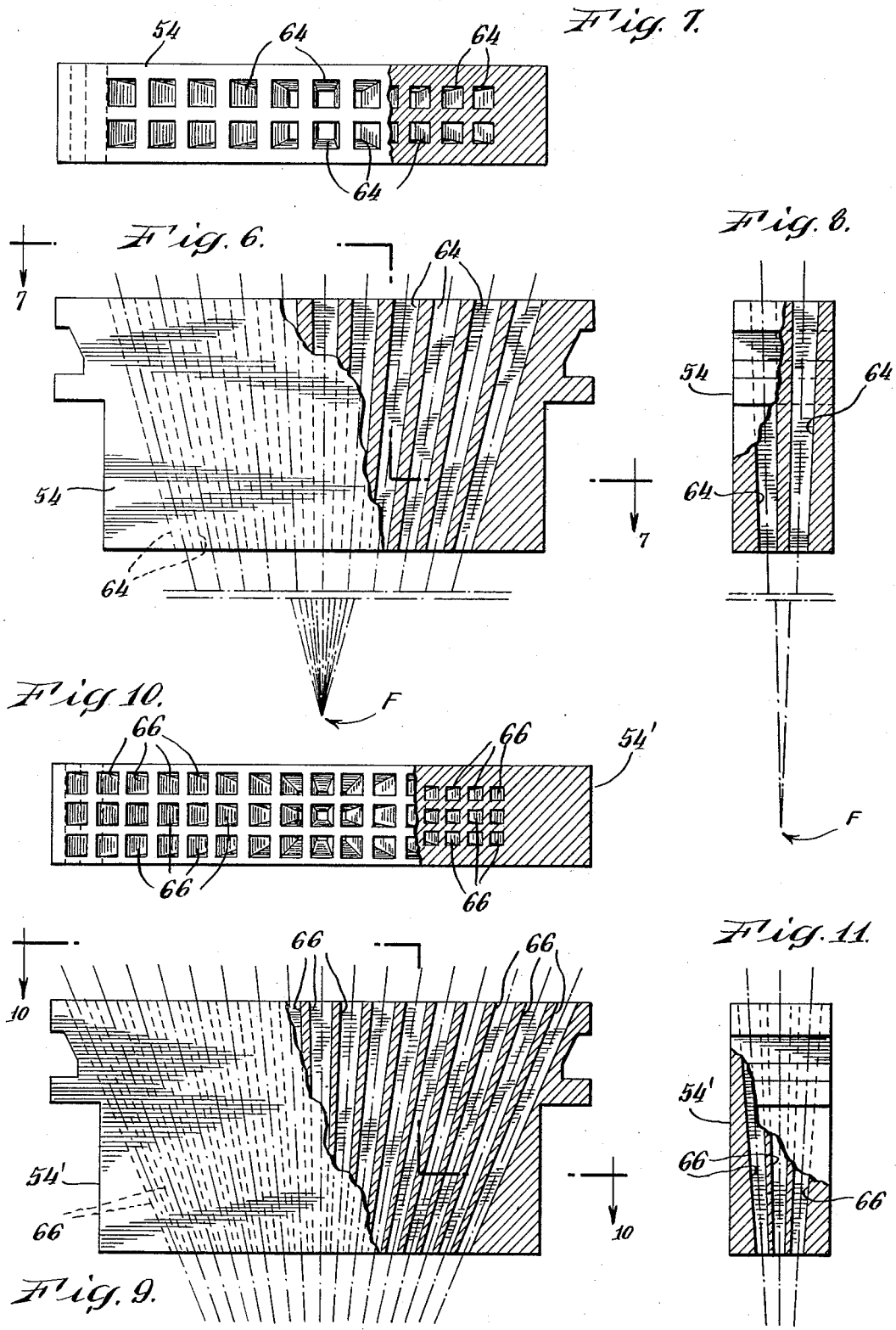

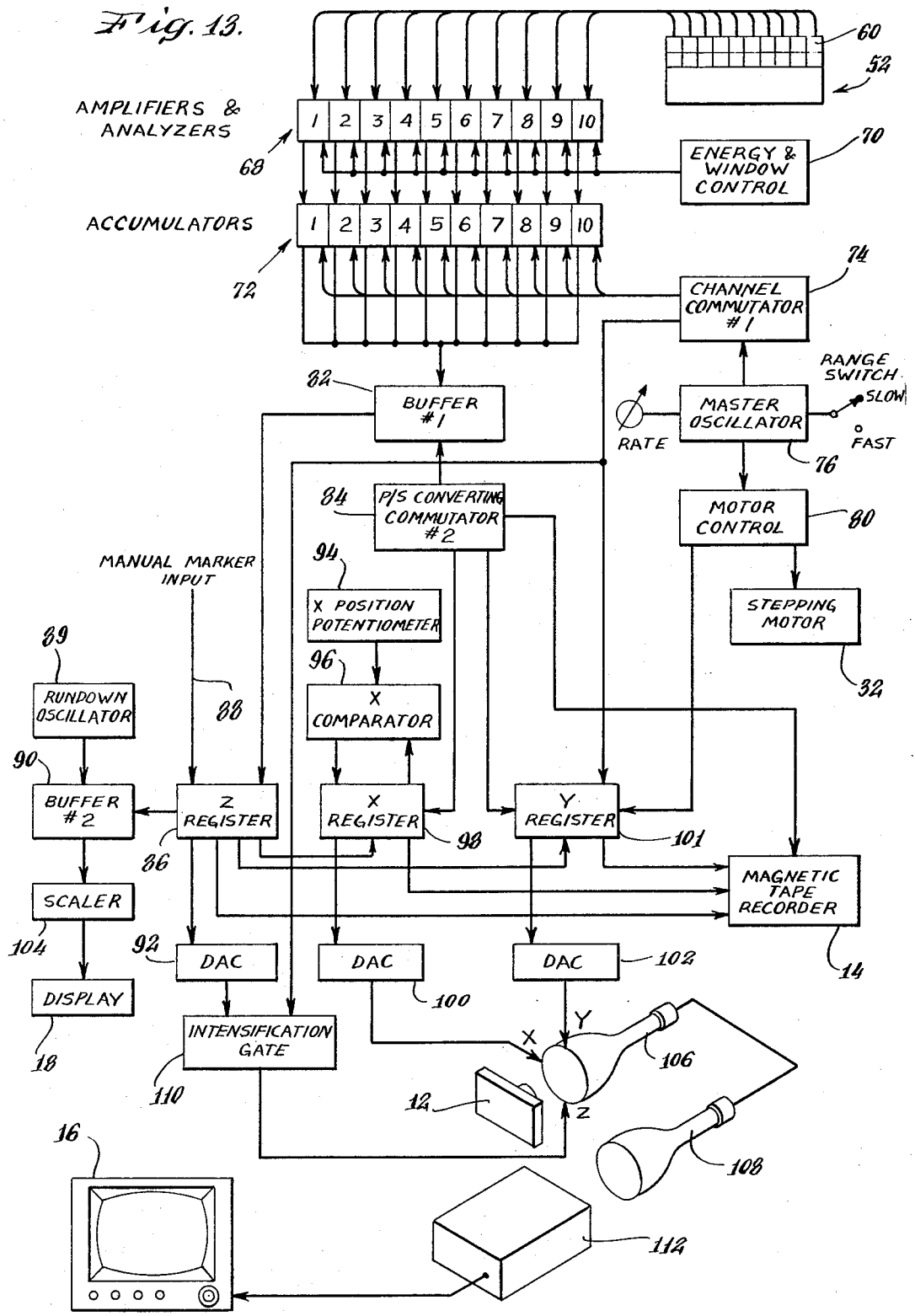

3,509,341
MULTIPLE DETECTOR RADIATION SCANNING DEVICE
Robert Hindel, Hamden, and George R. Utting, Guilford, Conn., assignors, by mesne assignments, to Picker Corporation, White Plains, N.Y., a corporation of New York
Filed June 1, 1966, Ser. No. 554,536
Int. Cl. G01t 1/20
U.S. Cl. 250—71.5                                    21 Claims

ABSTRACT OF THE DISCLOSURE

A multi-channel scanner is disclosed for mapping radioisotope distribution within a human body. The device employs a movable arm housing a scanning head enclosing a linear array of relatively large scintillation crystals. Each crystal is mounted on a collimator unit focused to an external point and atop each crystal is a light pipe and photodetector. The head is controlled to cause the focal points to trace an interlaced pattern. Digital to analogue circuitry provides a cathode ray tube display as one output, the spatial position of each collimator unit being converted to vertical and horizontal deflection voltages and the incidence of scintillations being converted to spot intensity. There is also provided a single control means for simultaneously adjusting the central energy and window width of all channels.

---

This invention relates to a radiation scanning device and, more particularly, to such a device which is particularly well adapted for mapping radioisotope distribution within a human body.

A number of schemes have been developed for utilizing gamma detecting scintillation crystals for scanning selected portions of the human body to determine radioisotope distribution. Most commonly, these schemes employ detectors which utilize a single crystal mounted in a scanning head which traverses the area to be inspected. In the usual scan path these detectors are moved rectilinearly—traversing a line, stepping a space at the end of the line, and traversing the next line in the opposite direction. An alternative arrangement is to move the detector along an arcuate path, stepping the detector to traverse a parallel arc. Either pattern is time consuming because the detector is sensitive to only one point at a time and because scanning time is lost during the stepping period. When a single detector is employed, the stepping time may be a substantial proportion of the entire scanning time. This lowers the patient capacity of the scanner and increases the time each patient must be immobilized.

It is also important that a radiation scanner achieve the best possible compromise between scanning time, detection efficiency, resolution, scanning field size, and usable readout. This permits, among other things, a reduction in radioisotope doses, more accurate diagnosis, and the imaging of most organs in a single scan or, alternatively, whole body scanning by several adjacent scans. In addition, it is desirable to be able to render the device responsive to different gamma energies so as to make it compatible with various radioisotopes in current use.

One prior art approach employs an arrangement of a device similar to a pinhole camera coupled with a thin scintillation crystal. However, such an arrangement is quite inefficient and attempts to improve on this approach have not been notably successful. Not only is the pinhole camera inefficient but the thin crystal also has low efficiency.

It has also been attempted to employ multiple crystals but these attempts have resulted in poor uniformity and loss of detail.

In addition to the scanning problem, there has been a considerable readout problem. This is because much of the information that would be desirable remains either unrecorded or inadequately recorded by prior art devices. For example, it would be desirable to provide a comparison of the information from several clearly defined parts of the patient's body. There is usually predictable distribution of radioactivity in accordance with anatomical structure and the metabolic affinity of the scanned organ to the administered isotope. Also, it would be desirable to display the information in several forms including cathode ray tube, photographic film, television, and direct numerical readout.

Since the display of the original scan information may not be optimal in terms of definition or intensity control, it would be advantageous to store all significant information magnetically. The playback could then be done in reduced time so that the best of several reproductions could be selected. In this way, the best utilization of the collected information would be at the disposal of the operator.

Accordingly, it is a primary object of the present invention to provide an improved radiation scanning device. Other objects are to provide such a device which has a large scanning field, which is capable of scanning a preselected field in much shorter time than has been previously possible, which has high detection efficiency, which is capable of improved spatial resolution, which provides multiple readouts, and wherein the energy level response is selectively adjustable. The manner in which the foregoing objects are achieved will be more apparent from the following description, the appended claims, and the figures of the attached drawings wherein:

FIG. 1 illustrates a scanner-console unit in accordance with this invention;

FIG. 2 is a right side view of the scanner of the invention, in partial cross section to illustrate its internal construction;

FIG. 3 is a cross section taken substantially along the line 3—3 of FIG. 2;

FIG. 4 is a cross section taken substantially along the line 4—4 of FIG. 2;

FIG. 5 is a perspective view of the scanning head of the invention, partially broken away to illustrate its internal construction;

FIG. 6 is a side view, partially broken away, of a collimator usable in this invention;

FIG. 7 is a cross section taken substantially along the line 7—7 of FIG. 6;

FIG. 8 is a right end view, partially broken away, of the collimator of FIG. 6;

FIG. 9 is a side view, partially broken away, of a modified collimator usable in this invention;

FIG. 10 is a cross section taken substantially along the line 10—10 of FIG. 9;

FIG. 11 is a right end view, partially broken way, of the collimator of FIG. 9;

FIG. 13 is a schematic diagram illustrating the operation of the invention;

Figure 12:
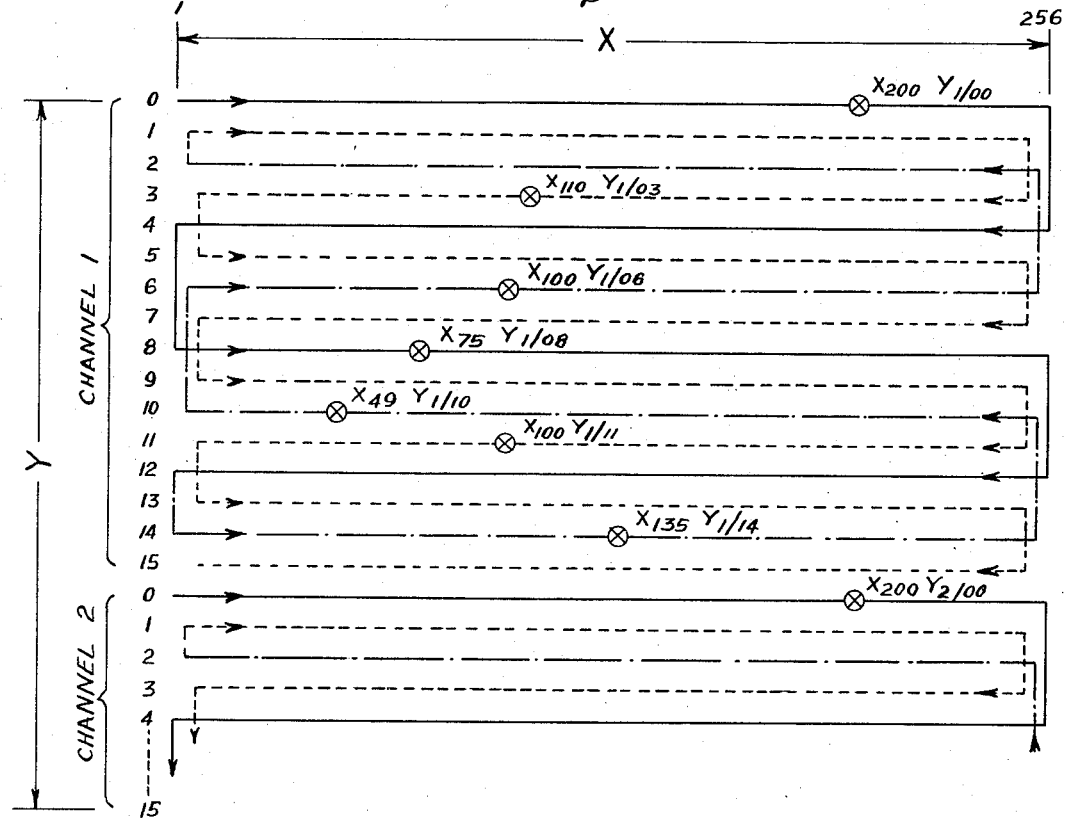
FIG. 12 is a diagram illustrating the scanning pattern employed by the invention.

The device of this invention comprises a plurality of detection channels mounted in a single scanning head. Each channel is focused to a separate focal point by means of collimator, the focal points being separated from one another by equal distances. The scanning head is moved across the patient's body transversely and, at the end of each transverse scan, is stepped longitudinally. The sum of the longitudinal steps is proportional to the distance between adjacent focal points. The information derived from the scan is operated upon by various logic systems to provide both digital and analog outputs.

SCANNING UNIT

Referring particularly to FIG. 1, there is illustrated a scanning unit comprising a housing H having a movable scanning arm A extending therefrom and arranged to be positioned over a patient's cot. The scanning unit is connected by means of electrical cables E to a desk type console C. The console includes most of the required electronics and is provided with several types of readout devices including a viewer 10, a camera 12, a tape recorder 14, a television monitor 16, and a digital display 18.

The construction of the scanning unit is most clearly illustrated in FIGS. 2–4. The housing H encloses a structural frame work 20, which supports, by means of tracks 22 and ball bearings 24, a vertical post 26 housed in a horizontally movable carriage 28. The post 26 is vertically movable by means of motor 30 to raise and lower the post 26. A stepping motor 32 provides for longitudinal motion of the carriage 28 and post 26 through tracks 22 and balls 24. As used in this description, the words "transverse" and "longitudinal" will be understood to apply to preferred directions relative to the patient's body, which is placed beneath the arm A and perpendicular to it.

The arm A encloses a horizontal boom formed from a pair of spaced channel irons 34, 36. Mounted against the web of channel iron 34 and extending above its top flange is a track member 38. A second track member 40 is mounted on the top flange of channel iron 36. A scanning head carriage 42 is mounted for movement along the arm A by means of flanged wheels 44 which engage the track member 38 and wheels 46 which rest upon track member 40. Transverse movement of the carriage 42 along the arm A is provided by means of a motor 48 and a sprocket chain 50. Supported by the carriage 42, and extending downwardly between the channel irons, is a scanning head 52.

SCANNING HEAD

The scanning head of this invention is illustrated in FIG. 5. Basically, this unit comprises an assembly of ten identical channels mounted alongside one another. Each channel includes a collimator 54, a scintillation crystal 56, a light pipe 58 of Lucite or other suitable material, and a photomultiplier tube 60. The crystals 56 may be of sodium iodide, or other suitable material, and are separated from one another by light reflectors (not shown) which retain the light of scintillation within the originating crystal. While the crystal size may vary, in the disclosed embodiment each crystal is six inches long, two inches thick, and seven-eighths inch wide. The light of scintillation generated in each crystal is transmitted to its corresponding photomultiplier tube 60 by means of the light pipe 58. It will be noted that the positions of the photomultiplier tubes 60 are staggered. This permits the use of larger tubes and avoids the disadvantages of the smaller sizes which include poor resolution and greater expense.

Associated with each of the crystals 56 is a collimator 54, the collimators being removably positioned within a mounting frame 62. The collimators are of lead, one inch wide, and are of the focusing type, thus providing ten focal points F spaced one inch apart. A coarse focusing collimator 54 is illustrated in FIGS. 6–8. The collimator is substantially rectangular in cross section and defines twenty-two channels 64 which extend vertically therethrough in two rows of eleven each. The channels 64 are of square cross section in a plane taken horizontally through the collimator and the four edges of each channel lie along radials from a single focal point F. It will thus be seen that the probability is very high that straight-line gamma radiation originating from any point other than F will strike and be absorbed by the lead of the collimator. Substantially the only radiation which will reach the crystal will be that originating from focal point F. A modified collimator 54' designed for fine focusing is illustrated in FIGS. 9–11. This collimator is basically similar to collimator 54 but defines fifty-one channels 66 arranged in three rows of seventeen each.

SCANNING PATTERN

In one embodiment of this invention, the scanning head 52 is designed to scan transversely a distance of forty-five centimeters. As there is only one inch between the focal points of the parallel channels, it is only necessary to step the assembly a total of slightly less than one inch in the longitudinal direction to cover a complete scanning field of forty-five centimeters by twenty-five centimeters.

The path of the scanning head of this invention is so arranged that the image is built up by degrees, giving first a general overall view and adding detail with increased scan time. This is achieved by a novel interlacing pattern which is illustrated in FIG. 12. FIG. 12 illustrates the pattern made by the focal point of the first channel collimator. The focal point of each other collimator will follow an identical path. The transverse direction is indicated by X and the longitudinal by Y. The proportions are distorted for purposes of explanation. The X dimension, may be as great as forty-five centimeters and the Y dimension of each channel is one inch. The first scan is made from one corner of the scanning field and follows the path indicated by the solid line. The first scan line in numbered 0. It will thus be seen that the first focal point starts its travel in the upper left hand corner of the illustrated field, moves transversely to a predetermined (and adjustable) limit, steps longitudinally to line 4, and travels in the opposite direction. Lines 8 and 12 are similarly scanned so that, at the end of four transverse passes, each of the ten focal points has made a coarse survey of its scanning field. If desired, scanning may be terminated at the end of this or any subsequent scanning sequence. Upon reaching the left end of line 12, the second scanning sequence begins along the broken lines by the focal point being stepped to line 14 and then proceeding, by means of alternate transverse motion and longitudinal steps, to the left end of line 2. The image is completed by means of a third sequence beginning at the left end of line 1, the focal point being stepped sequentially to each of the odd numbered lines and terminating at the left end of line 15.

Superimposed on the scanned path of FIG. 12 are eight image elements which are selected to illustrate the manner in which the image elements are digitally coded. The position along the axis of each element is recorded as an eight bit binary number. This provides a total of 256 positions along each line for a maximum scan of forty-five centimeters. Thus, it will be noted that the X position of each illustrated image element is, respectively, 200, 110, 100, 75, 49, 100, 135, and 200. The Y position of each image element is dependent upon two factors—the channel number and the line number. Thus, the uppermost image element in FIG. 12 is coded as being in channel 1, line 0, and the lower element as being in channel 2, line 0. The Y positions of the intermediate points are as indicated. In addition, the information content of each image element is expressed by a digital number corresponding to the brightness, as will be further explained below.

SYSTEM CIRCUITRY

FIG. 13 illustrates schematically the overall system circuitry of the scanning device of this invention. From this figure, it will be noted that the photomultiplier tube 60 corresponding to each channel of the scanning head 52 is connected to the input of a separate amplifier and pulse height analyzer unit 68. These units are numbered from 1 to 10 to correspond to their respective channels. The pulse height analyzer portions of units 68 are collectively controlled by an energy and window control 70, which is described in more detail below. The output pulses from each of the amplifier and analyzer units 68 are supplied to respective accumulator circuits 72. These accumulators temporarily store the input from the amplifier and analyzer units 68 until dumped by one of the sequential output signals from a slave oscillator 74 forming a channel commutator. The slave oscillator 74 is controlled by a variable frequency master oscillator 76 having a frequency which is selectively variable from 10 to 200 cycles per second. The output of the master oscillator 76 is also applied to a motor control circuit 80 which includes the transverse limit switches and controls stepping motor 32.

Figure 14:
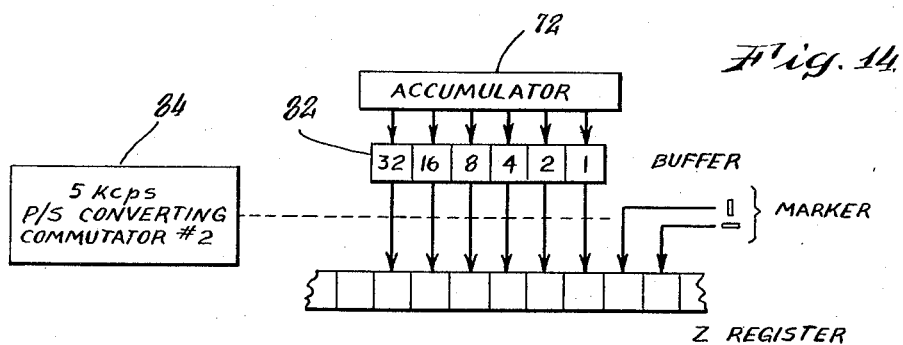
FIG. 14 is a schematic illustration of the Z register of the invention.

The outputs of accumulator circuits 72 are sequentially supplied to a six bit flip-flop buffer storage circuit 82. Buffer storage circuit 82 also receives an input from a second commutator oscillator 84 which functions as a parallel to serial converter. The output from the buffer storage circuit 82 is applied to a Z register 86 which contains magnetic tape storage in an eight bit format. Six bits are used to record the data from buffer storage circuit 82 and two are used to record a manual marker input 88. The manual marker is push button controlled and functions as a memory for identifying selected anatomical features. Each marker bit causes a distinctive deflection of the cathode ray to provide an anatomical reference point. The value stored in the Z register 86 represents the number of pulses received by each channel of the scanning head and controls the intensity of each image element. The relationship between the accumulator 72, the buffer 82 and the Z register 86 is illustrated in FIG. 14. Since buffer 82 is a six bit digital storage device, the maximum recordable intensity has a value of 63 units. The output from Z register 86 is applied to a second buffer storage circuit 90, to a digital to analog converter 92, and to a magnetic tape recorder 14.

An X position potentiometer 94 is mounted on the scanning device and has an output proportional to the transverse travel of the scanning head. This output is applied to an X comparator circuit 96. The X comparator converts the analog voltage from potentiometer 94 to an eight bit binary number which is supplied to the X register 98 where it is stored. The output of the X register is applied to the magnetic tape recorder 14 and also to a digital to analog converter 100. The register output is triggered by the second commutator oscillator 84.

Figure 15:
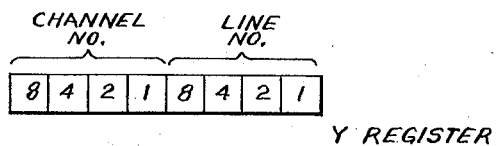
FIG. 15 is a schematic illustration of the manner in which information is recorded in the Y register of the invention.

The Y register 101 comprises an eight bit storage unit wherein the first four bits represent a digital number identifying the channel and the second four bits represent a digital number identifying the interlace line number. This is illustrated in FIG. 15. The Y register receives inputs from the motor control circuit 80, the slave oscillator 74, and the second commutator oscillator 84. Its output is supplied to magnetic tape recorder 14 and to digital to analog converter 102.

The magnetic tape recorder 14 comprises one readout of the scanning device of this invention. In addition, visual readouts are provided through a decimal numeric display and through cathode ray tubes. By means of a 100 kc. rundown oscillator 89, the digital output from the second buffer storage circuit 90 is provided to a scaler 104 which actuates the numeral display 18. Additional visual readout is provided by cathode ray tubes 106, 108. These tubes are operated in parallel and the Z signal represents the brightness, or intensity, of the cathode spot. This signal is received from digital to analog converter 92 through an intensification gate 110 which is periodically operated by a signal from the channel commutator oscillator 74. The X displacement of the cathode ray tube spot is provided by a signal from digital to analog converter 100 which is supplied to the horizontal deflection plates of the cathode ray tubes. The Y displacement of the cathode ray tube spot is provided by a signal from digital to analog converter 102 to the vertical deflection plates of the cathode ray tubes. Cathode ray tube 106 may be viewed directly by means of the viewer 10 of FIG. 1 and a permanent visual record may be made by time exposure of a camera 12. The face of cathode ray tube 108 is viewed by a television camera 112 which includes a storage vidicon and supplies the television monitor 16.

PULSE HEIGHT ANALYZER

Figure 18A:
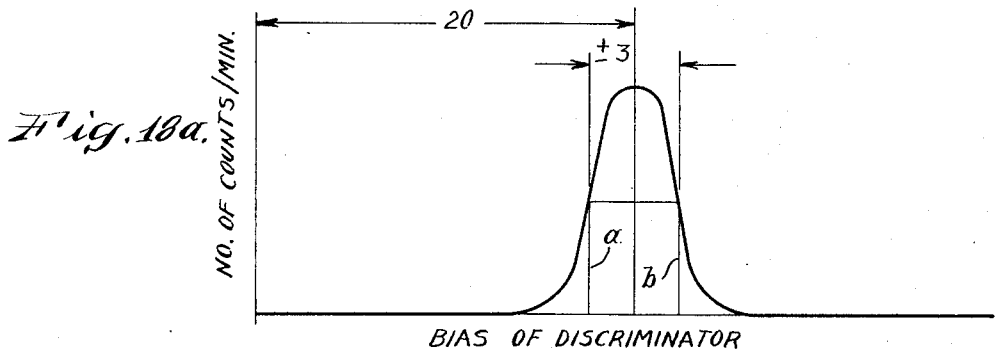
FIGS. 18A and 18B are two wave shapes illustrating the distribution of gamma ray energy.
Figure 18B:
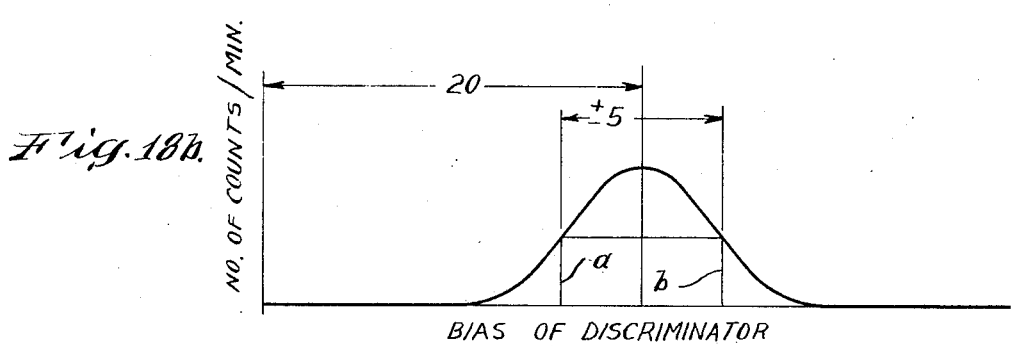

The distribution of pulse heights, as observed at the output of the amplifier portion of each of the amplifier-analyzer units 68, is approximately Gaussian, even though the rays are of single energy. The amount of this spread (the "standard deviation") is dependent on the crystal 56, the efficiency of light collection, and the photomultiplier tube 60. However, the number of pulses received is independent of these factors. FIGS. 18A and 18B illustrate two examples of pulse height distribution—the total number of pulses under the curves being identical.

The purpose of pulse height analysis is to select for further processing those pulses which contain the most information. These pulses would normally be those which are centered around the peak of the distribution curve.

The customary way of achieving energy selection is by the use of biased discriminator circuits—one for the lower level and one for the upper level. Only those pulses which have amplitudes intermediate the upper and lower levels will pass the anti-coincidence circuit.

In conventional pulse height analyzer circuits, a common bias is applied to both the upper level and lower level discriminators. The differential bias between the discriminators is supplied through an additional biasing resistor known as the "window control." The differential bias ("window" width) is thus determined by the setting of the lower level control and the window control. The window is centered by setting the lower level control at half the window width below the peak height of the distribution curve ($a$ in FIGS. 18A, 18B). The upper level control is then set at half the window width above the peak height of the curve ($b$ in FIGS. 18A, 18B). The problem with such conventional circuits is that any change in window widths also changes the window center.

Figure 19:
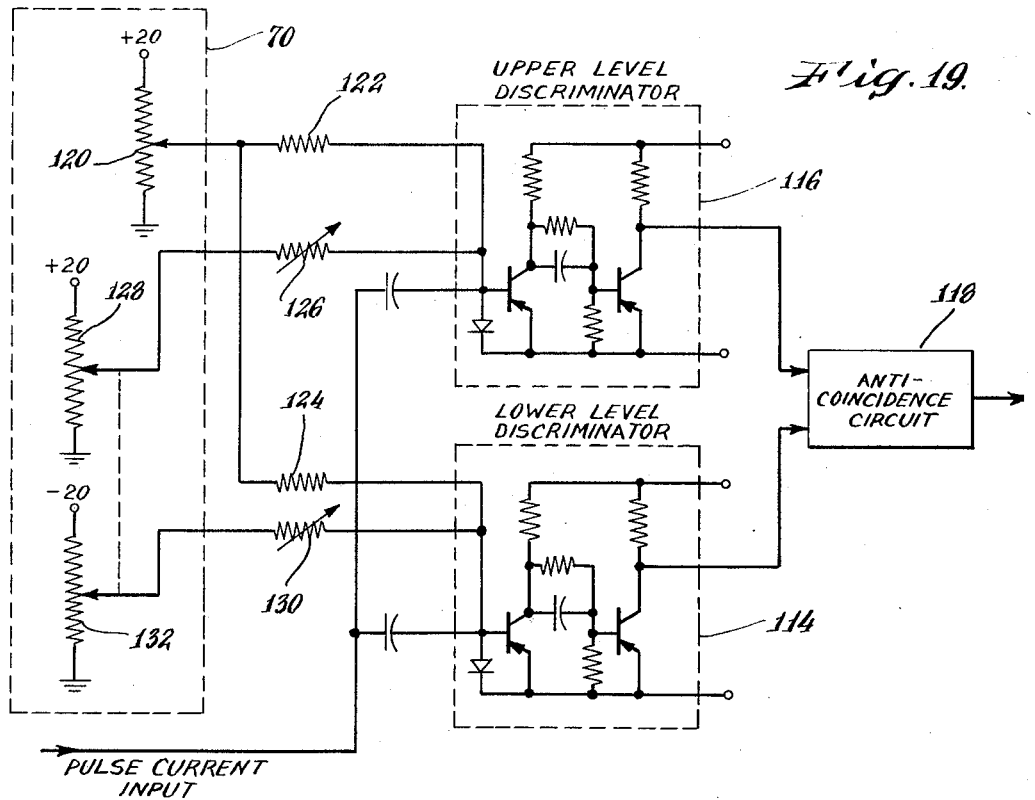
FIG. 19 is a schematic diagram of the pulse height analyzer of the invention.

The pulse height analyzer of the present invention is illustrated in FIG. 19. This analyzer includes the conventional low level discriminator 114 and upper level discriminator 116. The outputs of both discriminators are supplied to an anti-coincidence circuit 118. A common bias is supplied to both discriminators by means of variable resistor 120 and fixed resistors 122, 124. The width of the window is partially controlled by adjustable biasing resistors 126 and 128 which add to the biasing current through resistor 122 in the usual fashion. To keep the window centered, further adjustable biasing resistors 130 and 132 are connected to low level discriminator 114. The resistor 132 is ganged with resistor 128 but is connected to a power supply of opposite polarity. Accordingly, the current supplied through resistor 130 subtracts from the low level bias current through resistor 124. It will thus be seen that adjustment of resistors 128, 130 will vary the upper and lower discrimination levels by equal but opposite amounts, causing the window to remain centered. When the wipers of resistors 128, 132 are in the lowest position, both discriminators are biased by the same amount so that the effective window is zero. Variation of these resistors then opens the window without affecting the central energy discrimination. The resistors 126, 130 are duplicated in each of the pulse height analyzer circuits while resistors 128, 132 are common to all channels. This allows a common control while still permitting compensation in each channel for differences in energy resolution.

OPERATION

The operation of this invention will now be explained with particular reference to FIG. 13 and the timing chart of FIG. 17. As gamma rays are received by each of the crystals in scanning head 52 they are converted to light scintillations which are detected by photomultipliers 60 and converted to electrical pulses. Each photomultiplier has an amplifier and a pulse height analyzer 68 associated with it. These amplify and sort the pulses according to the energy of the gamma ray and pass only those pulses which have the desired information content. This energy selection is controlled by the window control circuit 70 by setting the central energy and the window for each of the ten channels as described above. Although this setting is done with a common control, it may be matched to the resolution capability of the individual channels by suitable adjustment of resistors 126, 130 (FIG. 19). The accumulators 72 serve to temporarily store the electrical pulses received from the amplifiers and analyzers 68.

Figure 17:
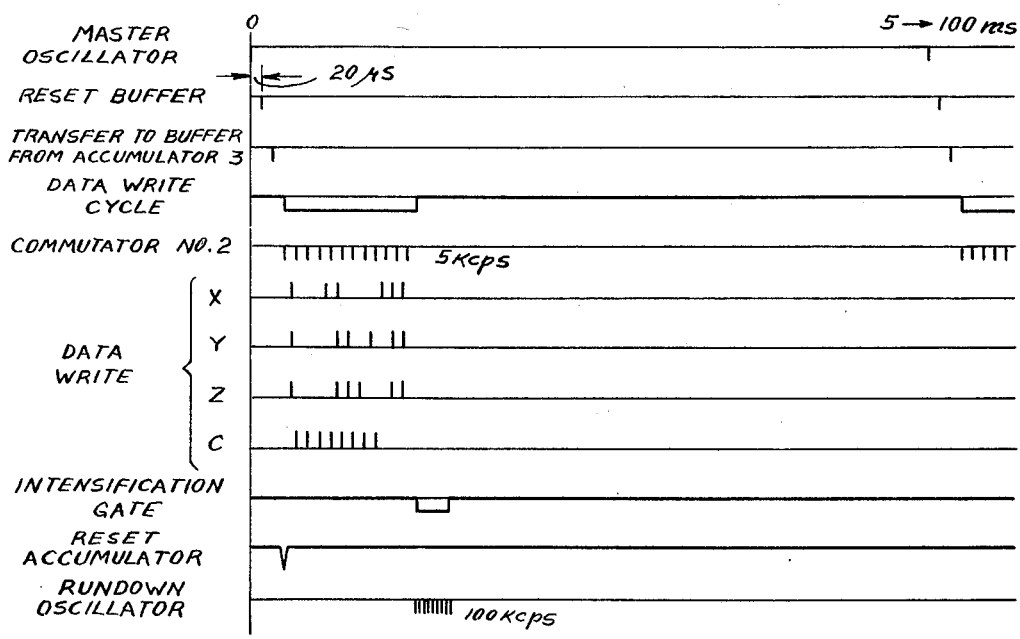
FIG. 17 is a timing chart illustrating the operation of the invention.

FIG. 17 illustates the events occurring during one cycle of the master oscillator 76. The variable frequency feature of the master oscillator permits the time period between its pulses to be varied from 5 to 100 milliseconds. It is to be understood that the frequency of the master oscillator also determines the scanning speed. This provides a fixed grid of measuring points by changing the inspection speed with the scanning speed. The time required to complete a full cycle from channel 1 to channel 10 is equal to the time required for the scanning head 52 to travel in the transverse direction 1.5, 3, or 6 millimeters, depending upon the control setting. For purposes of illustration, it will be assumed that the output of channel 3 is to be operated upon.

Buffer storage circuit 82 will already contain the information received from channel 2. Twenty microseconds after the master oscillator pulse at time "zero," a pulse is received from second commutator oscillator 84 which resets the buffer storage circuit 82 to zero. Thereafter, slave oscillator 74 transmits a pulse to number 3 accumulator 72 causing its output to be transferred to buffer storage circuit 82. After the information from the accumulator has been transmitted to the buffer storage circuit 82, the sequential signals from the second commutator oscillator 84 transmit this information to the Z register 86. This transfer is serial in nature and it will be seen that the number which is finally stored is a digital representation of the total number of pulses received by channel 3 since it was last inspected. This information is also transmitted to the second buffer storage circuit 90 where it is converted to decimal form by scaler 104 and placed on the display 18. This unit can display the number of counts in a selected scan line, in a selected channel, or in all ten channels. The scaler can also integrate the counts from a selected channel through ten cycles to obtain a better statistical average. The voltages on the plates of the cathode ray tubes correspond to the content of the X and Y registers. When intensity gate 110 is operated, the beam is intensified on the faces of the cathode ray tubes in accordance with the content of the Z register.

Figure 16:
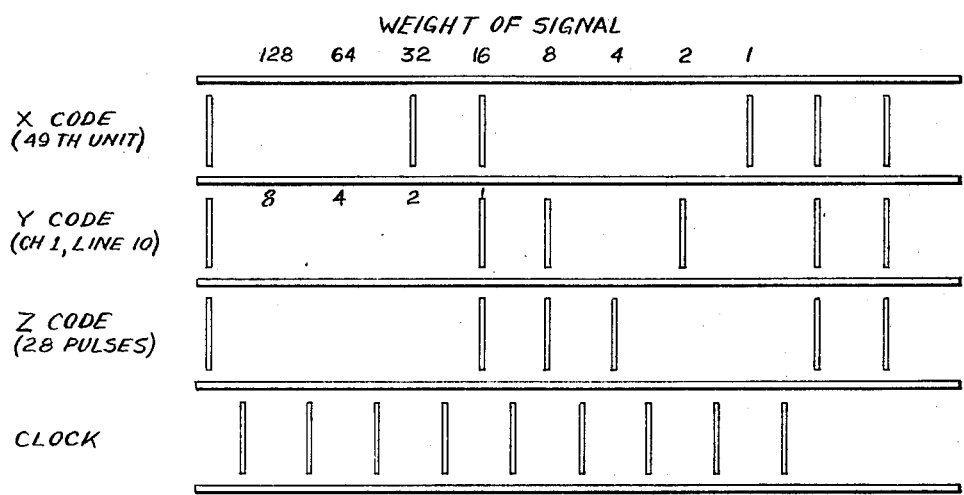
FIG. 16 illustrates the data format employed with the magnetic tape output of the invention.

During the data write cycle X, Y, and Z data which are being stored in the registers are also transferred to the magnetic tape recorder. The format in which this information is written on the tape is as indicated in FIG. 16 wherein the X position is written as an eight bit binary number, the Y position is written as two four bit binary numbers identifying the channel and the interlace line number and the Z intensity is written in terms of pulses received. The fourth row illustrates clock pulses. The last two pulses of the X, Y, and Z code signify the end of the word.

At the end of the data write cycle, a gating signal passes from the commutator oscillator 74 to the intensity gate 110. This results in a burst of pulses to the cathode ray tubes, causing the brightness of the spot to assume a value proportional to the counts received by channel 3. At the same time, accumulator 3 is reset and, at the end of the gate signal, the X, Y and Z registers are reset. The content of channel 4 is then acted upon in the same manner and the remaining channels sequentially thereafter.

The many advantages of this invention will now be apparent to those skilled in the art. It will also be apparent that a number of modifications and variations may be made therein without departing from its spirit and scope. Accordingly, the foregoing description is to be construed as illustrative only, rather than limiting. This invention is limited only by the scope of the following claims.

What we claim as new and desire to secure by Letters Patent of the United States is:

1. A radiation scanning device which comprises: a linear array of scintillation detector means; collimator means associated with each detector means to transmit thereto radiation emanating from a different preselected focal point; means for moving said array and said collimator means over a region to be inspected to cause each of said focal points to trace a preselected scanning pattern comprising a first set of sequential parallel lines and a second set of sequential parallel lines, at least some lines of said second set being between, and parallel to, adjacent lines of said first set; a plurality of photoelectric means, each responsive to the scintillations produced by a different one of said detector means to produce electrical signal pulses corresponding thereto; and means responsive to said electrical signal pulses and to the position of said array and said collimator means to produce an output representative of the radiation distribution of a scanned object.

2. The device of claim 1 wherein said scanning pattern further comprises: a third set of sequential parallel lines, at least some lines of said third set being between, and parallel to, adjacent lines of said first and second sets.

3. A radiation scanning device which comprises: a linear array of scintillation crystals of substantially rectangular cross section; collimator means associated with each crystal to transmit thereto radiation emanating from a different preselected focal point, all of said collimator means being joined in a unitary structure; means for moving said array and said structure over a region to be inspected to cause each of said focal points to trace a preselected scanning pattern; a plurality of photoelectric means, each responsive to the scintillations produced by a different one of said crystals to produce electrical signal pulses corresponding thereto; a plurality of accumulator means, each accumulator means being connected to receive and store electrical signal pulses from a different one of said photoelectric means; means for sequentially and repeatedly examining said accumulator means to control said output in response to the radiation intensity received by the crystal associated with each of said accumulator means; and means for varying the repetition rate of such examination in accordance with the scanning speed to inspect a preselected spatial pattern independent of scanning speed.

4. The device of claim 3 additionally comprising: address means having outputs representative of the transverse and longitudinal position of each of said collimator means at the time of examination of its associated accumulator means.

5. A radiation scanning device which comprises: a linear array of scintillation detector means; collimator means associated with each detector means comprising a radiation absorbing member defining therethrough a plurality of passages, each of said passages converging to a common focal point external of said member, the divergent ends of said passages being adjacent the associated detector means to transmit thereto radiation emanating from said focal point; means for moving said array and said collimator means over a region to be inspected to cause each of said focal points to trace a preselected scanning pattern comprising a first set of sequential parallel lines and a second set of sequential parallel lines, at least some lines of said second set being between, and parallel to, adjacent lines of said first set; a plurality of photoelectric means, each responsive to the scintillations produced by a different one of said detector means to produce electrical signal pulses corresponding thereto; a plurality of accumulator means, each accumulator means being connected to receive and store electrical signal pulses from a different one of said photoelectric means; means for sequentially and repeatedly examining said accumulator means to produce an output in response to the radiation intensity received by the detector means associated with each of said accumulator means; and address means having outputs representative of the transverse and longitudinal position of each of said collimator means at the time of examination of its associated accumulator means whereby said outputs are representative of the radiation distribuition of a scanned object.

6. The device of claim 5 wherein said longitudinal position is expressed as a first binary number indicative of the accumulator being examined and a second binary number indicative of the line containing the focal point associated with said accumulator.

7. The device of claim 6 wherein said transverse position is expressed as a third binary number indicative of the position of said focal point along said line.

8. The device of claim 7 wherein said responsive means expresses said output as a fourth binary number indicative of said radiation intensity.

9. The device of claim 8 wherein said responsive means includes magnetic recording means connected to record a function representative of said first, second, third, and fourth binary numbers.

10. The device of claim 8 wherein said responsive means comprises: first digital to analog converter means connected to receive said first and second binary numbers and produce a first voltage analog thereof; second digital to analog converter means connected to receive said third binary number and produce a second voltage analog thereof; third digital to analog converter means connected to receive said fourth binary number and produce a third voltage analog thereof; gate means in series with said third voltage; means for periodically activating said gate means to pass said third voltage; and cathode ray tube means having a first set of deflection plates connected to receive said first voltage and a second set of deflection plates connected to receive said second voltage, the intensity of said cathode ray tube being responsive to the magnitude of said third voltage.

11. The device of claim 1 wherein said responsive means includes pulse height analyzer means for selectively passing only those electrical signal pulses having amplitudes larger than a preselected lower level and smaller than a preselected upper level.

12. A radiation scanning device which comprises: a linear array of scintillation detector means; collimator means associated with each detector means comprising a radiation absorbing member defining therethrough a plurality of passages, each of said passages converging to a common focal point external of said member, the divergent ends of said passages being adjacent the associated detector means to transmit thereto radiation emanating from said focal point; means for moving said array and said collimator means over a region to be inspected to cause each of said focal points to trace a preselected scanning pattern; a plurality of photoelectric means, each responsive to the scintillations produced by a different one of said detector means to produce electrical signal pulses corresponding thereto; pulse height analyzer means for selectively passing only those electrical signal pulses having amplitudes larger than a preselected lower level and smaller than a preselected upper level, said lower and upper levels being selectively adjustable by equal and opposite amounts; and means responsive to the passed pulses and to the position of said array and said collimator means to produce an output representative of the radiation distribution of a scanned object.

13. The device of claim 12 wherein said pulse height analyzer means comprises: a lower level discriminator circuit having an input and an output; an upper level discriminator circuit having an input and an output; an anti-coincidence circuit receiving the outputs of both of said discriminator circuits; means supplying said electrical signal pulses to the inputs of both of said discriminator circuits; and means for biasing said discriminator circuits by equal but opposite amounts.

14. The device of claim 13 wherein said biasing means is operable by a single control.

15. The device of claim 13 wherein each of said photoelectric means is associated with a different pulse height analyzer and wherein said biasing means is common to all of said pulse height analyzers.

16. The device of claim 1 wherein each of said scintillation detector means comprises: a scintillation crystal; and a light transmitting member adjacent said crystal.

17. The device of claim 16 wherein each of said photoelectric means is a phototube mounted on a different one of said light transmitting members.

18. The device of claim 17 wherein said phototubes are in staggered relationship to one another.

19. A pulse height analyzer which comprises: a lower level discriminator circuit having an input and an output; an upper level discriminator circuit having an input and an output; an anti-coincidence circuit receiving the outputs of both of said discriminator circuits; means supplying electrical signal pulses to the inputs of both of said discriminator circuits; means supplying an equal bias to both of said circuits; and window width adjusting means for further biasing said discriminator circuits by equal but opposite amounts.

20. The analyzer of claim 19 wherein said window width adjusting means is operable by a single control.

21. A pulse energy selector which comprises: a plurality of pulse generating means; a pulse height analyzer associated with each of said pulse generating means and comprising a lower level discriminator circuit having an input connected to receive pulses from its corresponding pulse generating means and an output, an upper level discriminator circuit having an input connected to receive pulses from said corresponding pulse generating means and an output, an anti-coincidence circuit receiving the output of both of said discriminator circuits; common means supplying an equal bias to both of said circuits in each of said analyzers; and common window width adjusting means for further substantially simultaneously biasing the upper and lower level discriminator circuits of each analyzer by equal but opposite amounts.

References Cited

UNITED STATES PATENTS

| | | | |
|---|---|---|---|
| 2,529,666 | 11/1950 | Sands | 328—117 |
| 2,837,640 | 6/1958 | Goldsworthy | 328—117 |
| 3,011,057 | 11/1961 | Anger | 250—83.3 X |
| 3,221,731 | 12/1965 | Annis et al. | 250—71.55 X |
| 3,246,150 | 4/1966 | Stoddart et al. | 250—71.5 |

ARCHIE R. BORCHELT, Primary Examiner

U.S. Cl. X.R.

250—83.3; 328—116, 117